United States Patent [19]

Sheem

[11] Patent Number: 4,641,914

[45] Date of Patent: Feb. 10, 1987

[54] SINGLE MODE OPERATION WITH NON-SINGLE MODE OPTICAL FIBER TRANSMISSION CABLE

[75] Inventor: Sang K. Sheem, Richardson, Tex.

[73] Assignee: Rockwell International Corporation, El Segundo, Calif.

[21] Appl. No.: 668,129

[22] Filed: Nov. 5, 1984

[51] Int. Cl.⁴ ............................. G02B 6/26; G02B 6/42
[52] U.S. Cl. .................................................. 350/96.15
[58] Field of Search ........................... 350/96.15, 96.16

[56] References Cited

U.S. PATENT DOCUMENTS

| | | | |
|---|---|---|---|
| 4,188,087 | 2/1980 | D'Auria et al. | 350/96.15 |
| 4,261,639 | 4/1981 | Kogelnik et al. | 350/96.15 |
| 4,341,442 | 7/1982 | Johnson | 350/96.15 |
| 4,531,811 | 7/1985 | Hicks | 350/96.15 |
| 4,557,553 | 12/1985 | McLandrich | 350/96.15 |

*Primary Examiner*—William L. Sikes
*Assistant Examiner*—Robert E. Wise

*Attorney, Agent, or Firm*—V. Lawrence Sewell; H. Fredrick Hamann

[57] ABSTRACT

An optical fiber transmission path for interconnecting a transmitter and receiver for single mode operation at a predetermined wavelength. Most of the path is formed by a transmission cable made up of several optical fibers, spliced end-to-end, that are single mode at a wavelength longer than the predetermined wavelength, but possibly not single mode at the predetermined wavelength. The splice between the fibers is fabricated so as to exhibit minimized splice loss, as measured for only the fundamental mode at the predetermined wavelength. The transmission path of the invention also includes an optical fiber which is very short relative to the transmission cable and is in the path between the transmitter and the cable. The short fiber is selected to be single mode at the predetermined wavelength. A mode stripper is in the path, near the end of the transmission cable that is nearest the receiver. The mode stripper transmits only the fundamental mode at the predetermined wavelength.

5 Claims, 2 Drawing Figures

SINGLE MODE OPERATION WITH NON-SINGLE MODE OPTICAL FIBER TRANSMISSION CABLE

BACKGROUND OF THE INVENTION

This invention relates to an optical fiber transmission path which exhibits single mode operation at a predetermined wavelength, although the path is comprised principally of a transmission cable which is not necessarily single mode at the predetermined wavelength.

Presently, the most frequently used wavelength for single mode operation is 1300 nm. Therefore, the commonly available single mode fibers are designed to guarantee single mode operation at 1300 nm. It is also assured that these fibers will provide single mode operation above 1300 nm, but at shorter wavelengths such as 1200 nm, they may not be single mode. In designing a single mode system, it would be useful not to exclude the lower wavelengths such as 1200 nm from single mode operation, especially for wavelength division multiplexing. The present invention provides a way to ensure single mode operation of the system at a lower wavelength such as 1200 nm, using a transmission cable that may not be single mode at that wavelength. The invention is generally applicable to other wavelength combinations as well, such as 1550 nm and 1300 nm.

SUMMARY OF THE INVENTION

In accordance with the present invention, there is provided an optical fiber transmission path for interconnecting a transmitter and receiver for single mode operation at a predetermined wavelength. Most of the path is formed by a transmission cable made up of several optical fibers spliced end-to-end. The spliced fibers are single mode at a wavelength longer than the predetermined wavelength, but possibly not single mode at the predetermined wavelength. The splice between the fibers is fabricated so as to exhibit minimized splice loss, as measured for only the fundamental mode at the predetermined wavelength. The transmission path of the invention also includes an optical fiber which is very short relative to the transmission cable and is in the path between the transmitter and the cable. The short fiber is selected to be single mode at the predetermined wavelength. A mode stripper is in the path, near the end of the transmission cable which is nearest the receiver. The mode stripper transmits only the fundamental mode at the predetermined wavelength.

The presence of the short fiber between the transmitter and cable eliminates the excitation of higher order modes by the transmitter. The minimal splice loss at the splice points assures minimal conversion from the fundamental to higher order modes. Finally, the mode stripper removes any residual higher order modes present in the cable, before they reach the receiver. The result is a transmission path which is single mode at the predetermined wavelength, while having the bulk of its length made up of a transmission cable which is not necessarily single mode at that wavelength.

DESCRIPTION OF PREFERRED EMBODIMENT

Figure 1:
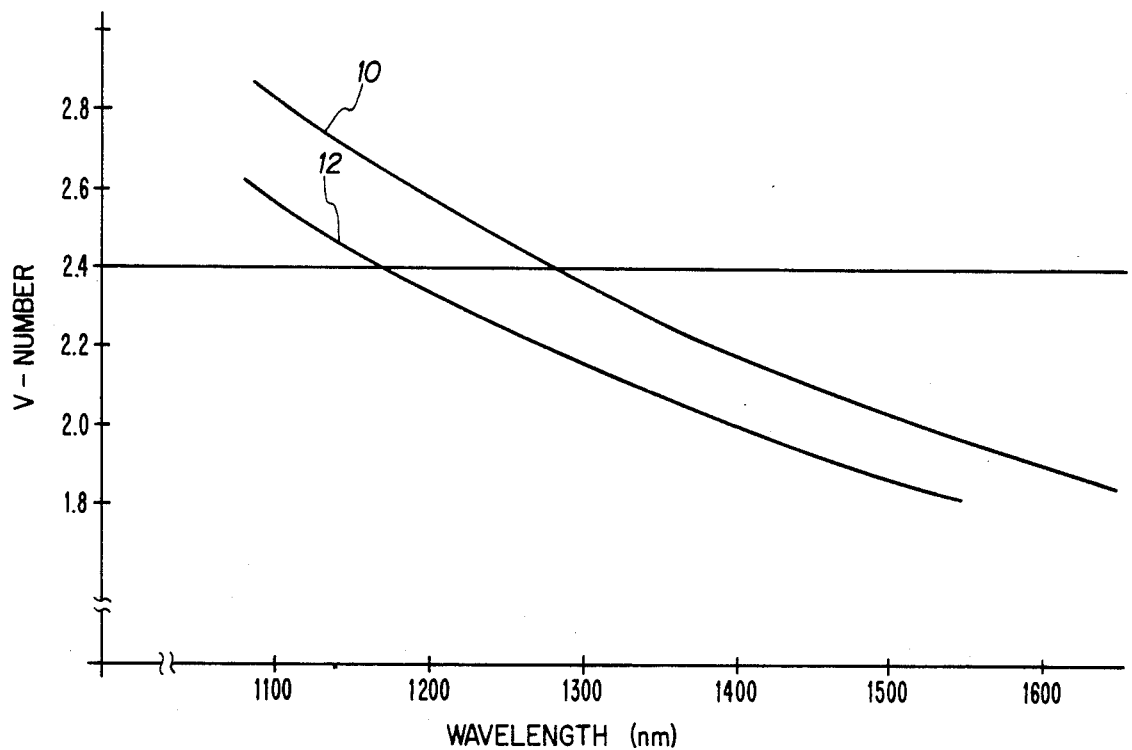
FIG. 1 is a graph of V-number versus wavelength for optical fibers.

FIG. 1 shows graphs 10 and 12, for two different optical fibers, of V-number versus wavelength. For illustration, it will be assumed that a V-number value of 2.4 or less is required for single mode operation of either of the fibers. For graph 10, single mode operation is possible for wavelengths above approximately 1280 nm. The fiber represented by graph 12 is single mode for wavelengths above approximately 1170 nm.

Much of the optical fiber transmission cable commercially available would have a characteristic represented by graph 10. Thus, it would permit single mode operation at the frequently used 1300 nm, but not at 1200 nm, for example. This application discloses how to use transmission cable corresponding to graph 10, along with some optical fiber of the type corresponding to graph 12 and additional fabrication techniques to provide a transmission path which is single mode at a desired frequency, such as 1200 nm.

Figure 2:
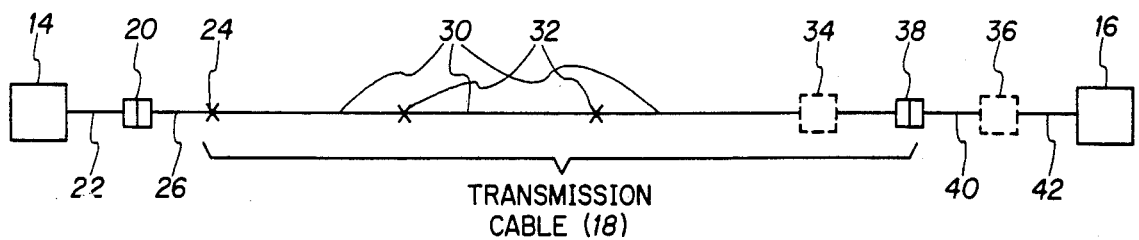
FIG. 2 is a schematic diagram of a transmission path according to the invention.

FIG. 2 illustrates in schematic form a transmission path in accordance with the invention. A laser transmitter 14 and optical detector receiver 16 are at either end of the transmission path. The principal transmission link between the transmitter and receiver is a transmission cable 8. This cable is preferably a commercially available one of the type described above, being guaranteed to provide single mode operation at 1300 nm, but not, for example, at 1200 nm. The cable is comprised of many fibers 30 spliced along the path. Some of the fibers of the cable would have a graph approximately like graph 10 of FIG. 1. It is also possible that some of the fibers of the cable 18 could have a graph like graph 12 of FIG. 1, actually making it single mode at 1200 nm. However, unless every fiber along the cable is single mode at 1200 nm, such a cable will not function as single-mode, due to excitation of higher order modes at various points.

Interconnecting the transmitter 14 and a connector 20 is an optical fiber 22 referred to as the pigtail. The fiber linking connector 20 and the first splice 24 with transmission cable 18 is the interconnection service cable 26. Fibers 22 and 26 are much shorter than cable 18. Pigtail 22 is typically less than a meter long and interconnection service cable 26 generally is less than 20 meters. Transmission cable 18 can be from 5 to 100 kilometers long. In accordance with the present invention, the pigtail 22 and interconnection service cable 26 should be capable of single mode operation at the predetermined lower wavelength (1200 nm in the continuing example) at which single mode operation is to be achieved. Since the lengths of fibers 22 and 26 are so short, they can economically be a special purchase fiber, selected to have a characteristic such as that of graph 12 in FIG. 1. Of course, most of the transmission path between transmitter and receiver will be the ordinary cable 18. Fibers 22 and 26 operate to suppress higher order modes which would otherwise be excited by the transmitter 14.

Transmission cable 18 is made up of a number of fibers 30, of which three are shown in the figure. The fibers 30 are connected by splices 32, and the cable 18 is connected to interconnection service cable 26 by a splice 24. I have recognized that the splices 32 and 24 can give rise to the generation of higher order modes. Therefore, in the transmission path according to the invention, the splices are specially tested during fabrication to eliminate them as sites of higher mode generation. This testing comprises monitoring and minimizing splice loss, but only for the fundamental mode at the predetermined lower wavelength, for example, 1200 nm. This can be done by measuring the splicing loss using a 1200 nm source and stripping off the higher order modes, either by fusion tapering the fiber at the ends of the segments 30, or by coiling the cable. For example, one meter of the cable coiled with a one inch radius will scatter the higher order modes in question. Minimizing the splice loss measured for only the fundamental mode will minimize the generation of higher order modes by the splice.

The transmission path of the invention further includes a mode stripper, either at position 34, as a part of transmission cable 18, or at position 36, in the path between connector 38 at the end of cable 18, with fibers 40 and 42 completing the path to receiver 16. The mode stripper can be a coil of fiber as described above in connection with the measurement of splice loss. It can also be a segment of fiber which is single mode at the wavelength in question, for example, 1200 nm. The position 34 is preferred for the mode stripper, because connector 38 has some potential for mode mixing, making mode stripping more effective at position 34.

As described, the present invention provides an optical fiber transmission path for interconnecting transmitter 14 and receiver 16 for single mode operation at a predetermined wavelength such as 1200 nm, employing a transmission cable formed of optical fibers 30 which are single mode at a longer wavelength such as 1300 nm, but possibly not at the lower predetermined wavelength such as 1200 nm. The total transmission path is rendered single mode by a combination of features. First, between the transmitter 14 and the transmission cable 18 is a segment of optical fiber (fibers 22 and 26), which is short compared to cable 18, and which is single mode at the predetermined frequency, for example, 1200 nm. Second, splices 24 and 32 are made which exhibit minimized splice loss measured for only the fundamental mode at the predetermined wavelength. Third, a mode stripper is located in the path near the end of the transmission cable which is nearest the receiver 16 to strip off any higher order modes before they reach the receiver.

It will be apparent to those skilled in the art that the invention is applicable to different combinations of wavelengths such as, for example, in a cable which is single mode at 1550 nm but not at 1300 nm.

I claim:

1. An optical fiber transmission path for interconnecting a transmitter and receiver for single mode operation at a predetermined wavelength, comprising the following elements, each forming a portions of said path:
   a transmission cable comprising at least two optical fibers in said path, said two fibers being single mode at a wavelength longer than said predetermined wavelength and non single mode at the predetermined wavelength;
   splice means for interconnecting said two optical fibers with substantially minimized splice loss as measured for only the fundamental mode at said predetermined wavelength;
   another optical fiber, in said path between said transmitter and said cable, said another fiber being selected to be single mode at said predetermined wavelength; and
   mode stripper means in said path near the end of the transmission cable which is nearest said receiver, for transmitting only the fundamental mode at said predetermined wavelength.

2. The transmission path of claim 1, wherein said mode stripper means is included in said transmission cable.

3. The transmission path of claim 1, wherein said mode stripper means is in said path between said transmission cable and said receiver.

4. The transmission path of claim 1, wherein said predetermined wavelength is shorter than a nominal 1300 nm wavelength and said two transmission cable fibers are single mode at the nominal 1300 nm and longer wavelengths.

5. The transmission path of claim 1, wherein said predetermined wavelength is shorter than a nominal 1550 nm wavelength and said two transmission cable fibers are single mode at the nominal 1550 nm and longer wavelengths.

* * * * *